US009158827B1

(12) United States Patent
Vu et al.

(10) Patent No.: US 9,158,827 B1
(45) Date of Patent: Oct. 13, 2015

(54) ENTERPRISE GRADE METADATA AND DATA MAPPING MANAGEMENT APPLICATION

(71) Applicant: Analytix Data Services, L.L.C., Chantilly, VA (US)

(72) Inventors: Linh Vu, Reston, VA (US); Michael Boggs, Reston, VA (US)

(73) Assignee: Analytix Data Services, L.L.C., Chantilly, VA (US)

( * ) Notice: Subject to any disclaimer, the term of this patent is extended or adjusted under 35 U.S.C. 154(b) by 0 days.

(21) Appl. No.: 13/764,771

(22) Filed: Feb. 11, 2013

Related U.S. Application Data

(60) Provisional application No. 61/597,476, filed on Feb. 10, 2012.

(51) Int. Cl.
*G06F 17/30* (2006.01)
(52) U.S. Cl.
CPC ................................. *G06F 17/30563* (2013.01)
(58) Field of Classification Search
CPC ................................................. G06F 17/30563
USPC ............................................................ 707/602
See application file for complete search history.

(56) References Cited

U.S. PATENT DOCUMENTS

| | | | |
|---|---|---|---|
| 7,596,573 B2 * | 9/2009 | O'Neil et al. ........................ 1/1 |
| 7,720,804 B2 * | 5/2010 | Fazal et al. ................... 707/601 |
| 7,870,016 B2 * | 1/2011 | Fazal et al. ................... 705/7.36 |
| 8,819,010 B2 * | 8/2014 | Fankhauser et al. .......... 707/736 |
| 2004/0078423 A1 * | 4/2004 | Satyavolu et al. ............ 709/203 |
| 2004/0083199 A1 * | 4/2004 | Govindugari et al. ............ 707/1 |
| 2005/0043961 A1 * | 2/2005 | Torres et al. ...................... 705/1 |
| 2007/0179939 A1 * | 8/2007 | O'Neil et al. ..................... 707/4 |
| 2009/0282045 A1 * | 11/2009 | Hsieh et al. ....................... 707/9 |
| 2010/0114952 A1 * | 5/2010 | Scanlon et al. ................ 707/770 |
| 2010/0131456 A1 * | 5/2010 | Williamson ................... 707/602 |
| 2011/0145636 A1 * | 6/2011 | Schauser et al. ................ 714/15 |
| 2011/0320460 A1 * | 12/2011 | Fankhauser et al. .......... 707/748 |
| 2012/0109947 A1 * | 5/2012 | Yu et al. ......................... 707/725 |
| 2012/0310875 A1 * | 12/2012 | Prahlad et al. ................ 707/602 |
| 2013/0117217 A1 * | 5/2013 | Bhide et al. ................... 707/602 |
| 2015/0026111 A1 * | 1/2015 | Matsuo et al. .................. 706/46 |

* cited by examiner

*Primary Examiner* — Sheree Brown
(74) *Attorney, Agent, or Firm* — Symbus Law Group, LLC; Clifford D. Hyra

(57) ABSTRACT

An enterprise grade data mapping application enables collaboration and reuse of many data integration components by leveraging metadata, enterprise transformations, and improves the process by creating automation, versioning, traceability, and impact analysis via its web enabled portal. This solution bridges this gap by leveraging metadata, and making the process automated, disciplined, predictable, and gives insight to the data lineage to both IT and business stakeholders via its web enabled portal. Mapping Manager brings standardization, collaboration, versioning, traceability, regulatory compliance and auditability, impact analysis, management visibility, and programmatic control where there is none now.

20 Claims, 19 Drawing Sheets

Project/Resource Manager Module

FIG. 9

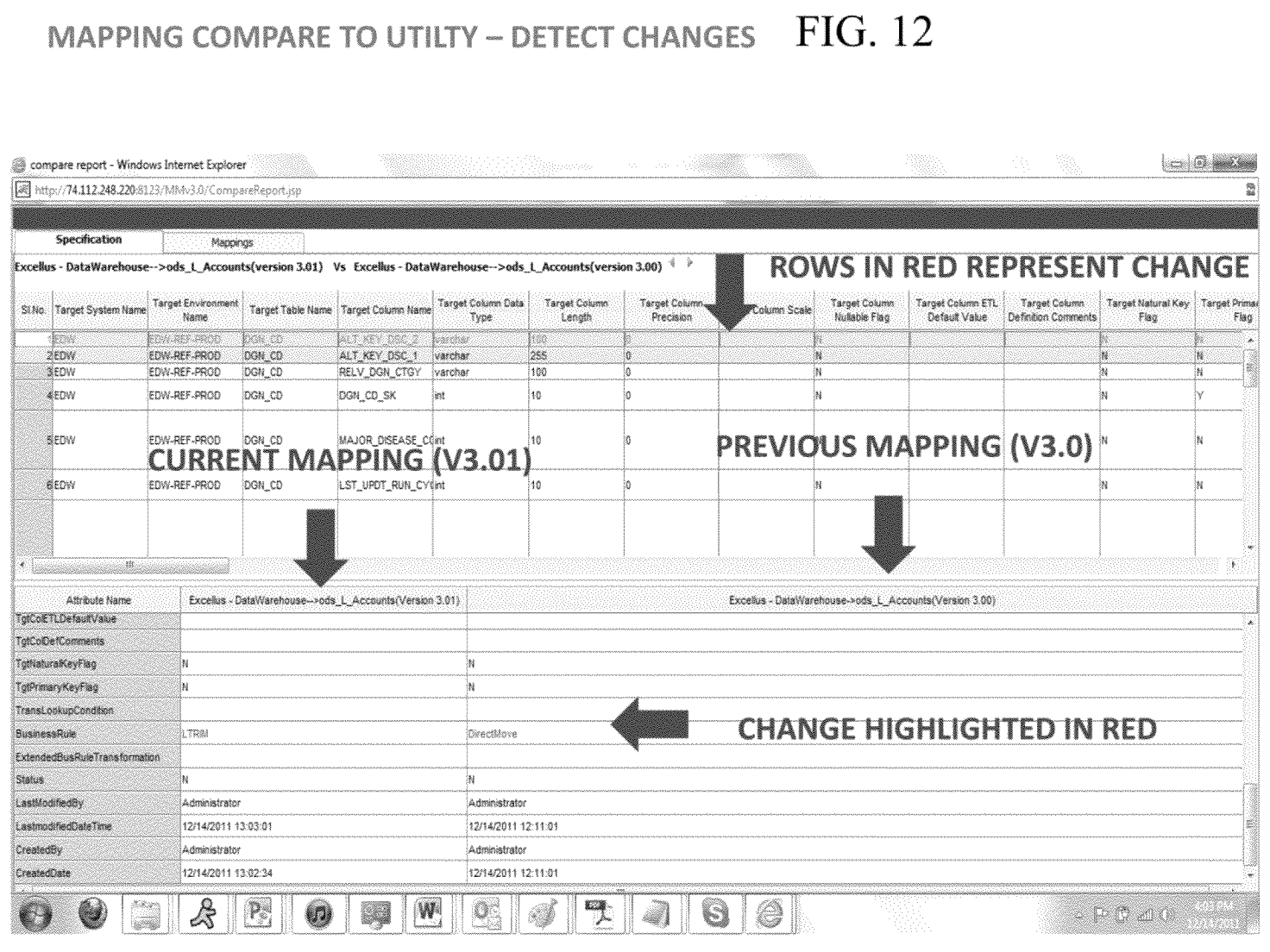

MAPPING COMPARE TO UTILTY – DETECT CHANGES    FIG. 12

ENTERPRISE GRADE METADATA AND DATA MAPPING MANAGEMENT APPLICATION

This application claims the benefit of U.S. Provisional Application No. 61/597,476, filed Feb. 10, 2012, which is hereby incorporated by reference in its entirety.

A computer program listing appendix is filed with this application via EFS-Web, including the files JavaCode2.txt, 6,088 KB in size, JSCode.txt, 357 KB in size, JSPCode-2.txt, 3,772 KB in size, and XSLCode.txt, 400 KB in size, all created Feb. 11, 2013 and all of which are hereby incorporated by reference herein in their entirety.

TECHNICAL FIELD

The invention relates to information technology ("IT"), and more particularly to data mapping, management and migration.

BACKGROUND

In data migration/integration projects, data is moved from files at a source location to files at a target location. Typically, the data to be moved is stored in tables of some kind, organized by table and by column within the data. This data may need to be integrated with existing data at the target location, and therefore transferring the source files in full and maintaining their existing table and column names, etc. is not an option. Rather, it is necessary to determine which tables and columns within those tables at the target location correspond to given tables and table columns of the source data. This process of mapping source data to target data is referred to as data mapping.

Existing data mapping applications lack standardization, collaboration, versioning, traceability, impact analysis, management visibility, auditability and programmatic control. The data integration industry creates data mappings manually, using manpower and spreadsheets and manually typing and copy/pasting tables and columns and typing transformation rules into spreadsheets. The manual mapping process lacks control, auditability and visibility into the mappings, is non-standard, time consuming, error-prone, and costly and makes management of the mappings and tracking of changes very difficult or impossible. Inaccurate and incomplete mapping rules negatively impact data integration projects by driving up costs and delivery timeframes. Organizations managing large amounts of data and data migration projects frequently end up with hundreds or thousands of manually-created data mapping spreadsheets and/or document files, each tailored to a given data migration project and lacking any centralization or organization. Building mapping specifications for the ETL process is manual.

Needs exist for improved data mapping applications.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

A new Mapping Manager application is an enterprise grade data mapping application which enables collaboration and reuse of many data integration components by leveraging metadata and enterprise transformations, and improves the data mapping process by creating automation, versioning, traceability, and impact analysis via its web-enabled portal. This application bridges the gap left by other solutions by leveraging metadata, and making the data mapping process automated, disciplined, and predictable, and gives insight into the data lineage to both IT and business stakeholders via its web-enabled portal. Mapping Manager brings standardization, collaboration, versioning, traceability, impact analysis, management visibility, and programmatic control where previous solutions had none.

Embodiments of the application and process scan metadata from operational systems into a versionable metadata repository and leverage it to automate the pre-Extract, Transfer and Load (ETL) data mapping process of data integration software projects. First, metadata is scanned and dragged and dropped to create mappings. Source and target data are entered into the application and scanned for table and column name metadata, automatically harvesting that information and eliminating the need for manually entering it. The system may have a number of built in transformation rules, some of which by default may apply to all data migration projects, while others are customized for given types of projects. Users may select appropriate transformation rules from those included with the system and build their own, then apply them to selected source and target data to produce data mappings.

The data mappings are versioned and a new version can be created at any time. For example, between initial data mapping and an ETL job, target data may change, necessitating a revised data mapping from the source data to the new target data. After revising data mappings for a given target data set, a new data mappings version can be created. Changes can be detected between versions of mappings. Thus, a new version can be compared with a previous version or an even newer version to view all changes between them. This simplifies the approval process, since if a previous data mappings version has already been approved only the changes between that version and the new version require approval. Changes may also occur with the source data pre-ETL. Post ETL, a typical data conversion projects may be finalized and removed from the manager. However, organizations handling large amounts of data and a number of data migrations/integrations may manage all data mappings and data flows across the organization using the system, and therefore may keep data mappings after an ETL job has been completed, as it may be desirable, for example, for additional source data to be added to a data migration project at a later date. The data mappings would then be updated for the new source data, a new data mappings version created and approved, and a new ETL job carried out to migrate the new source data. Metadata (tables and columns) associated with source and target systems changes frequently, so metadata must be rescanned/refreshed frequently, while updating mappings and comparing changes to various versions. It is critical to track changes to data mappings and view changes as the metadata and business rules change with data mappings.

The system allows for all data flows (data migration and integration projects) to be managed from one central system. The system may have a central repository for all metadata and transaction rules, allowing data and transaction rules added to the system for one project to be re-used in another project. The ability to review and organize all existing projects from a central location and to re-use metadata and transaction rules from previous projects greatly streamlines data mapping for new projects and the review and approval process.

Mappings may be exported to auto-generate ETL jobs for various types of ETL software. The system may be ETL-tool agnostic, allowing it to create ETL jobs for any desired ETL software. ETL jobs may be reverse engineered from ETL software as data mappings, allowing the application to function as an ETL conversion tool. Thus, an ETL job from one ETL tool, which inherently contains data mappings, may be fed into the system and the data mappings stripped out. The system may then turn the data mappings into an ETL job for any ETL software tool, as normal, thus converting an ETL job for one ETL software tool into an ETL job for a second ETL software tool.

One aspect of this disclosure relates to a system configured to facilitate centralized, versioned, automated data mapping for data integration projects. In some embodiments, the system may include one or more servers. The server(s) may be configured to communicate with one or more client computing platforms according to a client/server architecture. Users may access the system via the client computing platforms, for instance, to manage data mappings for data integration projects and to input information pertaining to a new data integration project.

The server(s) may be configured to execute one or more computer program modules. The computer program modules may include one or more of a data integration project information input module 106, scanning and metadata retrieval module 108, data mappings generator module 110, data mappings organization and display module 112, Agnostic ETL job generator module 114, versioning module 116, lineage analyzer module 122, ETL job reverse engineering module 124, audit trail module 126, reporting module 128, transformation rules generation and assignment module 130, and/or other modules. It is noted that the client computing platforms may include one or more computer program modules that are the same as or similar to the computer program modules of the server(s) to facilitate management of data mappings for data integration projects.

In embodiments, the data integration project information input module 106 may be configured to receive information relating to a data integration project including data source information and data target information, and optionally also transformation rules.

In embodiments, the scanning and metadata retrieval module 108 may be configured to scan at least one of a data source and a data target, locate metadata and extract it to a metadata repository. Scanning and metadata retrieval module 108 may again scan the data source or data target, locate any changes to the data source, data target, and/or transformation rules, and extract any such changes.

In embodiments, the data mappings generator module 110 may be configured to generate data mappings between source data and target data for the data integration project using metadata extracted from the data source and the data target and transformation rules assigned to the data integration project. Data mappings for the data integration project may be updated in accordance with changes made to at least one of the data source, data target, and assigned transformation rules.

In embodiments, the data mappings organization and display module 112 may be configured to organize and display data mappings for multiple data integration projects.

In embodiments, the Agnostic ETL job generator module 114 may be configured to generate an ETL job for any of at least two ETL software tools based on generated data mappings. In an ETL job conversion process, an ETL job may be generated for an ETL software tool different from one that an ETL job was imported from, based on data mappings extracted from the imported ETL job.

In embodiments, the versioning module 116 may be configured to save point-in-time snapshots of the generated data mappings and show element-by-element comparisons between the saved snapshots of the generated data mappings. A point-in-time snapshot of generated data mappings may be saved after updating the data mappings.

In embodiments, the lineage analyzer module 122 may be configured to generate graphical displays for selected column names stored in the metadata repository showing a progression of column names for data associated with the selected column names due to associated data integration projects and transformation rules applied in each associated data integration project. It may show how all data movement "hops" as a column or other data element is federated (moved) from system to system, inside and outside the organization (e.g. if a data element such as SSN number is moved from a customer system, to ODS, to a data warehouse to flat files which are sent outside the organization, the lineage analyzer module may graphically show all the links along the way and can display whether the data is encrypted or not as it is moved/federated in and outside the organization.

In embodiments, the ETL job reverse engineering module 124 may be configured to import an ETL job from an ETL software tool and extract associated data mappings.

In embodiments, the audit trail module 126 may be configured to track and audit every action performed by a user on the system. The audit trail module may track and audit every click of a user in the system: as mapping rules change or data mappings are edited, audit trails of who created the mapping, when it was created, who modified the mapping, when it was modified right down the exact element that was modified are all audited, making the tool conducive to meeting regulatory compliance requirements with Basel Financial Services Regulations and HIPPA PHI and SPI HealthCare regulatory committees.

In embodiments, the reporting module 128 may be configured to mine the metadata repository and transformation rules store to generate mapping intelligence and metadata reports, including at least one of system analysis reports, mapping specification reports, mapping validation reports, data dictionary reports, and impact analysis reports.

In embodiments, the transformation rules generation and assignment module 130 may be configured to, assign transformation rules to the data integration project based on user selections from a transformation rules store.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 9 is a flowchart showing the operation of a Mapping Manager application, in an embodiment.

FIG. 12 is a mapping compare to utility-detect changes screen, in an embodiment.

FIG. 15 is a screen orientation for a mapping manager module, in an embodiment.

FIG. 16 is a screen shot illustrating the management and maintenance of shared/reusable transformations, in an embodiment.

FIG. 19 is a screen shot showing an impact analysis of a database or file table and column, in an embodiment.

DETAILED DESCRIPTION

Figure 1:
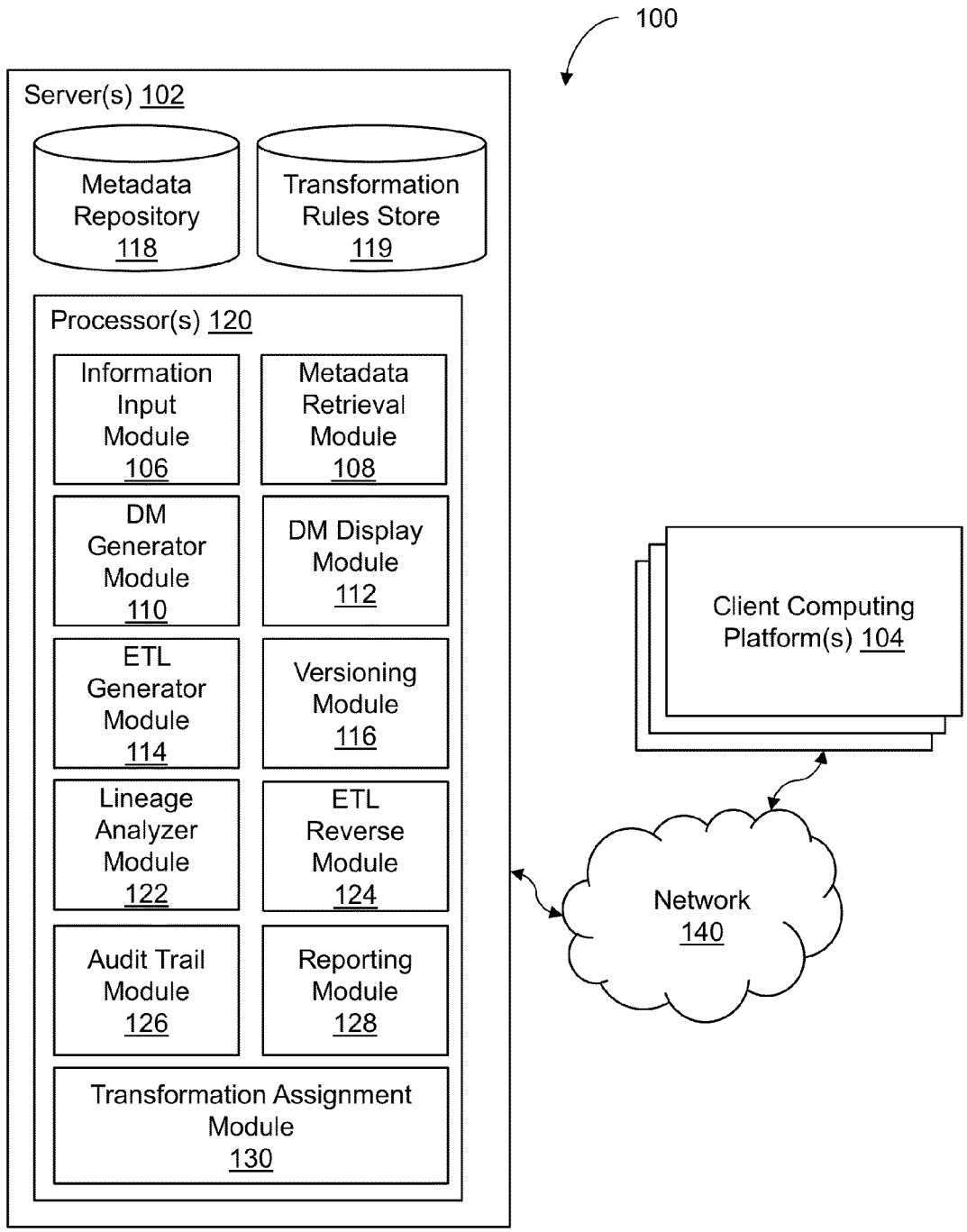
FIG. 1 illustrates a system configured to facilitate centralized, versioned, automated data mapping for data integration projects, in accordance with an embodiment.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

Embodiments of the present invention can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being complied or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, Python, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc.

Embodiments as disclosed below relate to data mapping management for data integration projects.

Embodiments of a Mapping Manager complement all major Extraction, Transformation, Load ("ETL") tools providers/suites/packages and are enterprise grade, allowing collaboration and reuse of many data integration components. In embodiments, the mapping manager includes three core modules: Mapping Manager, System Manager, and Project Manager; and a codeset and reference data manager module for managing codesets and reference data. Key features of embodiments of the mapping manager include:

Metadata repository: An open source database management system stores all system metadata and source to target mappings. The repository enables mapping intelligence reports to be created to analyze mappings and metadata in various ways through third party Business Intelligence ("BI") tools and SQL.

Ability to import existing mapping specifications

Support for one to many relationships

Ability to store/share mapping documentation at the mapping level

Ability to define encryption requirements for sensitive data (Sarbanes-Oxley, Protected Health Information, etc.)

Ability to enforce mapping standard with customizable mapping templates

Ability to define, share, and reuse transformations

Ability to perform impact analysis across the enterprise at multiple levels: Source and Target Table, Column and Transformations Bi-directional navigation of upstream and downstream systems Ability to select update strategies Ability to preview data directly from operational systems Ability to define test plans and track test results Ability to associate source extract SQL to data mappings.

Auto-generation of ETL jobs from industry leading ETL tool providers

Ability to track changes at the individual mapping specification level.

Version control mapping specifications at the individual mapping as well as project level.

Ability to track changes between versions and refer back to any previous or current version Ability to automatically upload and share source and target metadata and documentation Ability to dynamically create and modify source to target mapping specifications via drag-and-drop capabilities from a metadata explorer Ability to create user-defined, shared and reusable transformations to drive mapping standards, version and approve mapping specifications.

Ability to browse profiled metadata via the metadata browser and dynamically create sophisticated source-to-target mapping specifications via drag-and-drop capabilities from the metadata browser to the mapping manager data grid.

Customize and print mapping specification in multiple formats, Excel, PDF, etc.

In embodiments of a new data mapping method, users and projects are created, project documents are stored, users are assigned to projects, systems are created and metadata is loaded, and system documents are stored. The Mapping Manager leverages projects, users, and system information. The mapping manager contains 90% of the work done to manage data movement specifications. The project manager may be used to create users, create projects, assign users to projects, and attach project related documentation. The system manager may be used to create system and environment information, load system metadata, and attach system documentation.

Embodiments of the mapping manager contain mappings by project and enterprise transformations. Built-in enterprise transformations can be leveraged and selected from a drop-down menu. New transformations may be added or deleted. The metadata browser enables users to drag and drop system metadata to define data movement specifications (Source and target table name and column name and all database management system ("DBMS") related metadata). Users may perform impact analysis at various levels. Test cases and testing dispositions and mapping documentation may be attached. Data mappings can be audited and tracked. System, project, and mapping reports can be run. Data mappings can be versioned and archived. Users may import and export existing mappings and import and export mappings contained in the application. Users may export data movement specifications as ETL jobs to multiple ETL software tools. ETL jobs from multiple ETL software tools may be reverse engineered and imported into Mapping Manager.

The Mapping Manager application in embodiments is used to create, manage, audit, track, and facilitate data integration projects, and specifically source to target data movement instructions for any integration project where data is being moved, transformed, or federated from point A to point B. It can be used to manage resources, manage projects, and manage project and system documentation. It can also be used to manage reporting specifications.

This application in embodiments takes an agnostic approach to integrating with ETL tools via XML integration. The application can produce an ETL job to be consumed by ETL tool vendors via an XML file.

FIG. 1 illustrates a system configured to facilitate centralized, versioned, automated data mapping for data integration projects, according to an exemplary embodiment of the present invention. In some embodiments, system 100 may include one or more system servers 102. The system server(s) 102 may be configured to communicate with a client computing platform 104 according to a client/server architecture. The users may access system 100 via client computing platform 104, for instance, to manage data mappings for data integration projects and to input information pertaining to a new data integration project.

The system server(s) 102 may be configured to execute one or more computer program modules. The computer program modules may include one or more of a data integration project information input module 106, scanning and metadata retrieval module 108, data mappings generator module 110, data mappings organization and display module 112, Agnostic ETL job generator module 114, versioning module 116, lineage analyzer module 122, ETL job reverse engineering module 124, audit trail module 126, reporting module 128, transformation rules generation and assignment module 130, and/or other modules. As noted, the client computing platform(s) 104 may include one or more computer program modules to facilitate data integration project management.

The data integration project information input module 106 may be configured to receive information relating to a data integration project including data source information and data target information.

The scanning and metadata retrieval module 108 may be configured to scan at least one of a data source and a data target, locate metadata and extract it to a metadata repository. Scanning and metadata retrieval module 108 may again scan the data source or data target, locate any changes to the data source, data target, and/or transformation rules, and extract any such changes.

The data mappings generator module 110 may be configured to generate data mappings between source data and target data for the data integration project using metadata extracted from the data source and the data target and transformation rules assigned to the data integration project. Data mappings for the data integration project may be updated in accordance with changes made to at least one of the data source, data target, and assigned transformation rules.

The data mappings organization and display module 112 may be configured to organize and display data mappings for multiple data integration projects.

The Agnostic ETL job generator module 114 may be configured to generate an ETL job for any of at least two ETL software tools based on generated data mappings. Mappings may automatically be exported to auto-generate ETL Jobs by leveraging the XML based SDK of ETL software tool providers to generate ETL jobs agnostically for all ETL software tools. In an ETL job conversion process, an ETL job may be generated for an ETL software tool different from one that an ETL job was imported from, based on data mappings extracted from the imported ETL job.

The versioning module 116 may be configured to save point-in-time snapshots of the generated data mappings and show element-by-element comparisons between the saved snapshots of the generated data mappings. A point-in-time snapshot of generated data mappings may be saved after updating the data mappings.

The lineage analyzer module 122 may be configured to generate graphical displays for selected column names stored in the metadata repository showing a progression of column names for data associated with the selected column names due to associated data integration projects and transformation rules applied in each associated data integration project.

The ETL job reverse engineering module 124 may be configured to import an ETL job from an ETL software tool and extract associated data mappings. Data mappings are extracted from imported ETL jobs by leveraging the XML based software developer's kit (SDK) of the ETL Tool providers to reverse engineer the ETL Jobs as data mappings. This enables the system to function as an ETL Conversion tool where ETL jobs created in one ETL software tool can be reverse engineered as data mappings and then exported to another ETL software tool, automatically converting the ETL Job.

Audit trail module 126 may be configured to track and audit every action performed by a user on the system.

The reporting module 128 may be configured to mine the metadata repository and transformation rules store to generate mapping intelligence and metadata reports, including at least one of system analysis reports, mapping specification reports, mapping validation reports, data dictionary reports, and impact analysis reports.

The transformation rules generation and assignment module 130 may be configured to, assign transformation rules to the data integration project based on user selections from a transformation rules store.

A given client computing platform 104 may include one or more processors configured to execute computer program modules. The computer program modules may be configured to enable an expert or user associated with the given client computing platform 104 to interface with server(s) 102 and/or provide other functionality attributed herein to client computing platform 104. For example, the computer program modules may be configured to input data integration project information into the system 100. By way of non-limiting example, the given client computing platform 104 may include one or more of a server or server cluster, desktop computer, a laptop computer, a handheld computer, a netbook, a smartphone, a kiosk or terminal, and/or other computing platforms.

The server(s) 102 may include metadata repository 118, transformation rules store 119, one or more processor(s) 120, and/or other components. The server(s) 102 may include communication lines or ports to enable the exchange of information with a network 140 and/or other computing platforms. The illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Metadata repository 118 and transformation rules store 119 may comprise non-transitory storage media that electronically stores information. In embodiments, metadata repository 118 and transformation rules store 119 may be consolidated into a single electronic data store. The electronic storage media of metadata repository 118 and transformation rules store 119 may include one or both of a system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Metadata repository 118 and transformation rules store 119 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The Metadata repository 118 and transformation rules store 119 may include one or more virtual storage resources (e.g., cloud storage, a virtual private network, and/or other virtual storage resources). Metadata repository 118 and transformation rules store 119 may store software algorithms, information determined by processor(s) 120, information received from server(s) 102, information received from client computing platform 104, and/or other information that enables server(s) 102 to function as described herein, including metadata including table and table column names for source and target data and transformation rules.

Processor(s) 120 is configured to provide information processing capabilities in system server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. The processor(s) 120 may be configured to execute modules 106, 108, 110, 112, 114, 116, 122, 124, 126, 128, 130 and/or other modules. The processor(s) 120 may be configured to execute modules 106, 108, 110, 112, 114, 116, 122, 124, 126, 128, 130, and/or other modules by software; hardware; firmware; some combination of software, hardware, and/or firmware; and/or other mechanisms for configuring processing capabilities on processor(s) 120. As noted, in certain implementations, a given client computing platform 104 may include one or more computer program modules. The given client computing platform 104 may include one or more processors that are the same as or similar to processor(s) 120 of the server(s) 102 to execute such computer program modules of the given client computing platform 104. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112, 114, 116, 122, 124, 126, 128, 130 are illustrated in FIG. 1 as being co-located within a single processing unit, in implementations in which processor(s) 120 includes multiple processing units, one or more of modules 106, 108, 110, 112, 114, 116, 122, 124, 126, 128, 130 may be located remotely from the other modules. The description of the functionality provided by the different modules 106, 108, 110, 112, 114, 116, 122, 124, 126, 128, 130 is for illustrative purposes, and is not intended to be limiting, as any of modules 106, 108, 110, 112, 114, 116, 122, 124, 126, 128, 130 may provide more or less functionality than is described. For example, one or more of modules 106, 108, 110, 112, 114, 116, 122, 124, 126, 128, 130 may be eliminated, and some or all of its functionality may be provided by other ones of modules 106, 108, 110, 112, 114, 116, 122, 124, 126, 128, 130. As another example, processor(s) 120 may be configured to execute one or more additional modules that may perform some or all of the functionality attributed below to one of modules 106, 108, 110, 112, 114, 116, 122, 124, 126, 128, 130.

Figure 2:
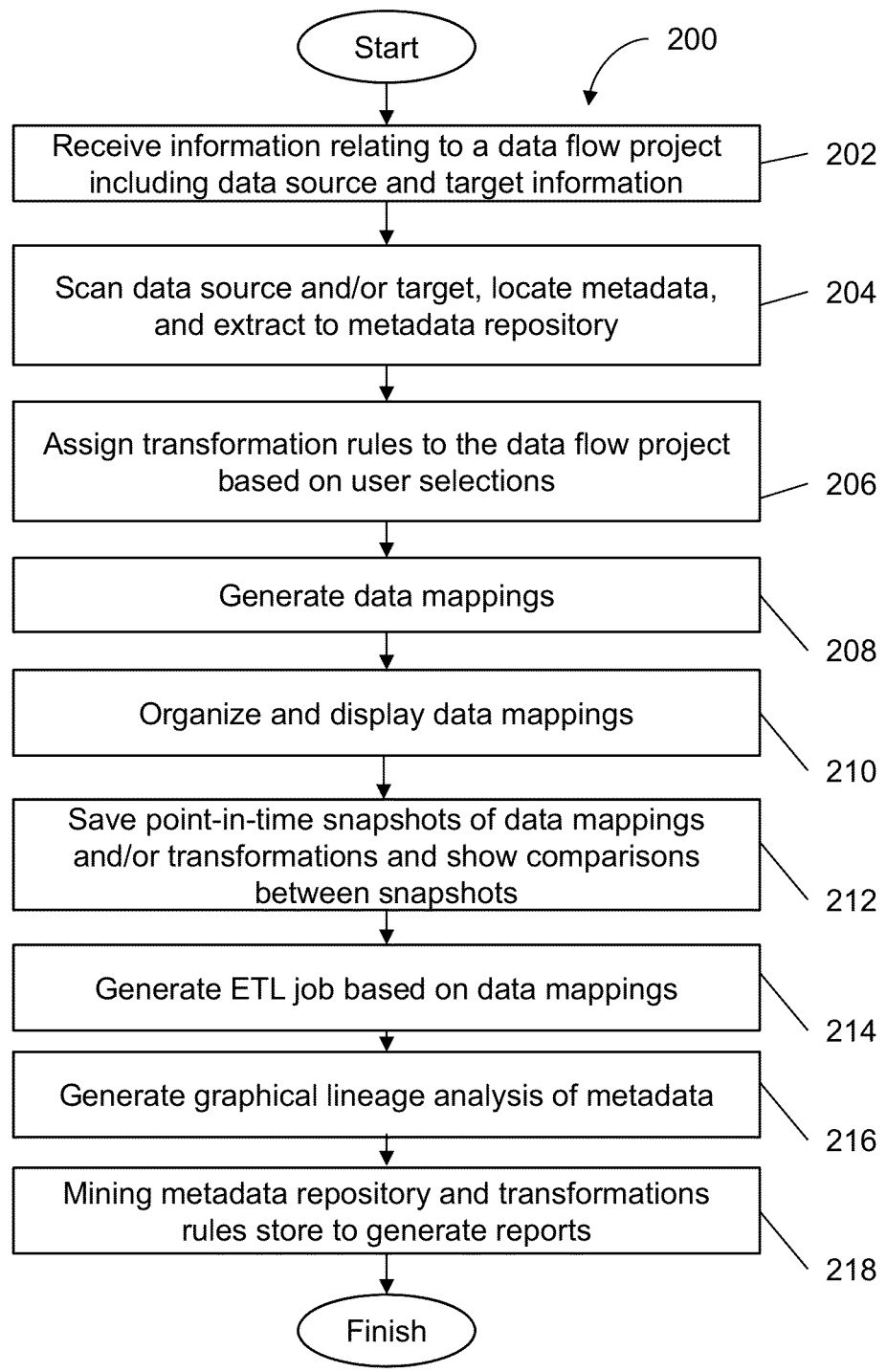
FIG. 2 illustrates a method for generating versioned data mappings, ETL jobs and reports for data integration projects, in accordance with an embodiment.

FIG. 2 illustrates a method for generating versioned data mappings, ETL jobs and reports for data integration projects, in accordance with an embodiment. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information may be received relating to a data integration project and including data source information and data target information. Operation 202 may be performed by a data integration project information input module that is the same as or similar to data integration project information input module 106, in accordance with one or more implementations.

At an operation 204, at least one of a data source and a data target may be scanned and metadata may be located and extracted to a metadata repository. Operation 204 may be performed by a scanning and metadata retrieval module that is the same as or similar to scanning and metadata retrieval module 108, in accordance with one or more implementations.

At an operation 206, transformation rules are assigned to the data integration project based on user selections from the transformation rules store. Operation 206 may be performed by a transformation rules generation and assignment module that is the same as or similar to transformation rules generation and assignment module 130, in accordance with one or more implementations.

At an operation 208, data mappings between source data and target data for the data integration project are generated using metadata extracted from the data source and the data target and the transformation rules assigned to the data integration project. Operation 208 may be performed by a data mappings generator module that is the same as or similar to data mappings generator module 110, in accordance with one or more implementations.

At an operation 210 data mappings for multiple data integration projects are organized and displayed. Operation 210 may be performed by a data mappings organization and display module that is the same as or similar to data mappings organization and display module 112, in accordance with one or more implementations.

At an operation 212 point-in-time snapshots of the generated data mappings may be saved and element-by-element comparisons between the saved snapshots of the generated data mappings may be shown. Operation 212 may be performed by a versioning module that is the same as or similar to versioning module 116, in accordance with one or more implementations.

At an operation 214 an ETL job may be generated for any of at least two ETL software tools based on the generated data mappings. Operation 214 may be performed by an Agnostic ETL job generator module that is the same as or similar to Agnostic ETL job generator module 114, in accordance with one or more implementations.

At an operation 216 graphical displays for selected column names stored in the metadata repository may be generated showing a progression of column names for data associated with the selected column names due to associated data integration projects and transformation rules applied in each associated data integration project. Operation 216 may be performed by a linear analyzer module that is the same as or similar to lineage analyzer module 122, in accordance with one or more implementations.

At an operation 218 the metadata repository and transformation rules store may be mined to generate mapping intelligence and metadata reports, including at least one of system analysis reports, mapping specification reports, mapping validation reports, data dictionary reports, and impact analysis reports. Operation 218 may be performed by a reporting module that is the same as or similar to reporting module 128, in accordance with one or more implementations.

Figure 3:
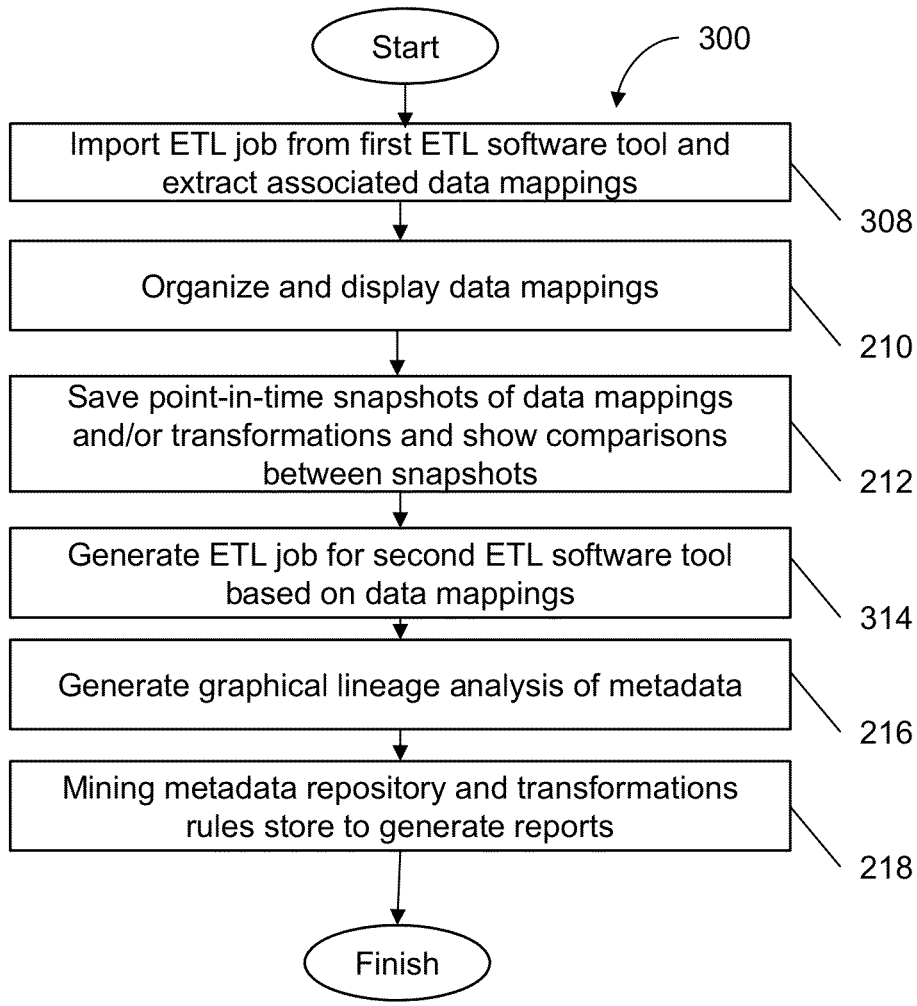
FIG. 3 illustrates a method for converting an ETL job from one ETL software tool to another, in accordance with an embodiment.

FIG. 3 illustrates a method for converting an ETL job from one ETL software tool to another, in accordance with an embodiment. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

Operations 210, 212, 216 and 218 are substantially as described above with reference to FIG. 2. At an operation 308 an ETL job may be imported from an ETL software tool and associated data mappings may be extracted. Operation 308 may be performed by an ETL job reverse engineering module that is the same as or similar to ETL job reverse engineering module 124, in accordance with one or more implementations.

At an operation 314 an ETL job may be generated for an ETL software tools different from the one the ETL job was imported from, based on the extracted data mappings. Operation 308 may be performed by an Agnostic ETL job generator module that is the same as or similar to Agnostic ETL job generator module 114, in accordance with one or more implementations.

Figure 4:
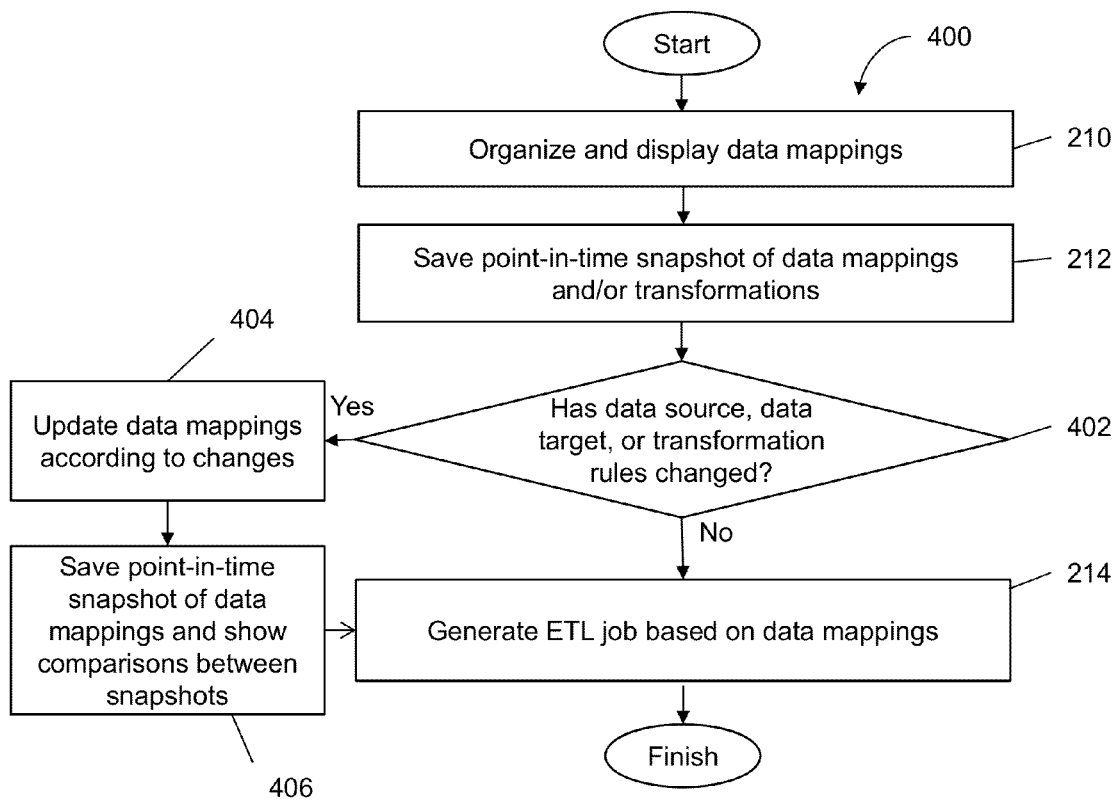
FIG. 4 illustrates a method for updating and versioning data mappings based on changes to data source or target or transformation rules, in accordance with an embodiment.

FIG. 4 illustrates a method for updating and versioning data mappings based on changes to data source or target or transformation rules, in accordance with an embodiment. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

Operations 210, 212, and 214 are substantially as described above with reference to FIG. 2. At an operation 402 a determination may be made as to whether changes were made to at least one of the data source, data target, and assigned transformation rules. Operation 402 may be performed by a scanning and metadata retrieval module that is the same as or similar to scanning and metadata retrieval module 108, in accordance with one or more implementations.

At an operation 404 data mappings for the data integration project may be updated in accordance with changes made to at least one of the data source, data target, and assigned transformation rules. Operation 404 may be performed by a data mappings generator module that is the same as or similar to data mappings generator module 110, in accordance with one or more implementations.

At an operation 406 a point-in-time snapshot of the generated data mappings may be saved after updating the data mappings. Operation 406 may be performed by a versioning module that is the same as or similar to versioning module 116, in accordance with one or more implementations.

Figure 5:
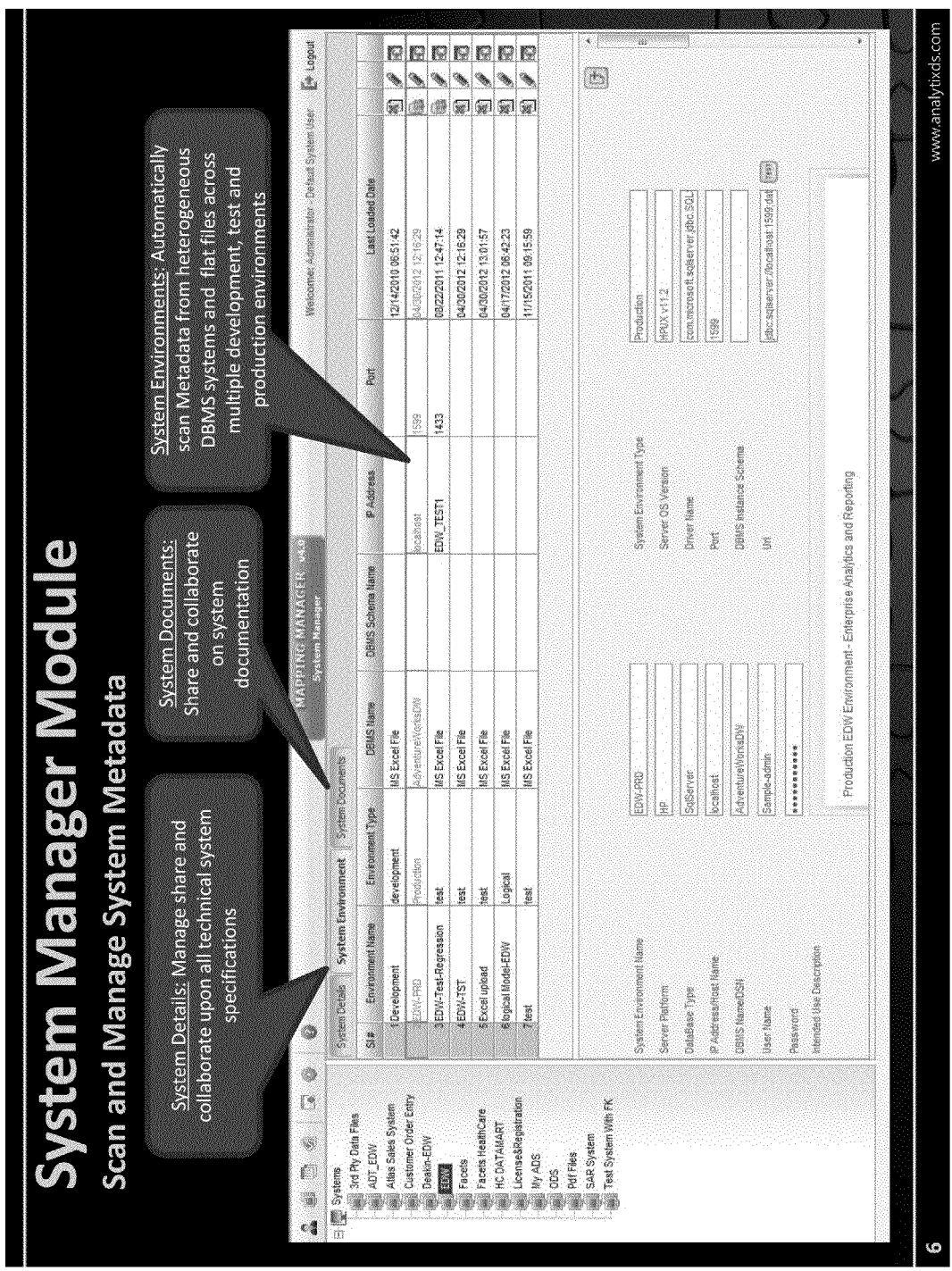
FIG. 5 is a screen shot of a system manager module, in an embodiment.

FIG. 5 is a screen shot of a system manager module, in an embodiment. The left navigation window displays various available systems for viewing. One system is currently being viewed and various information about the system is displayed.

Figure 6:
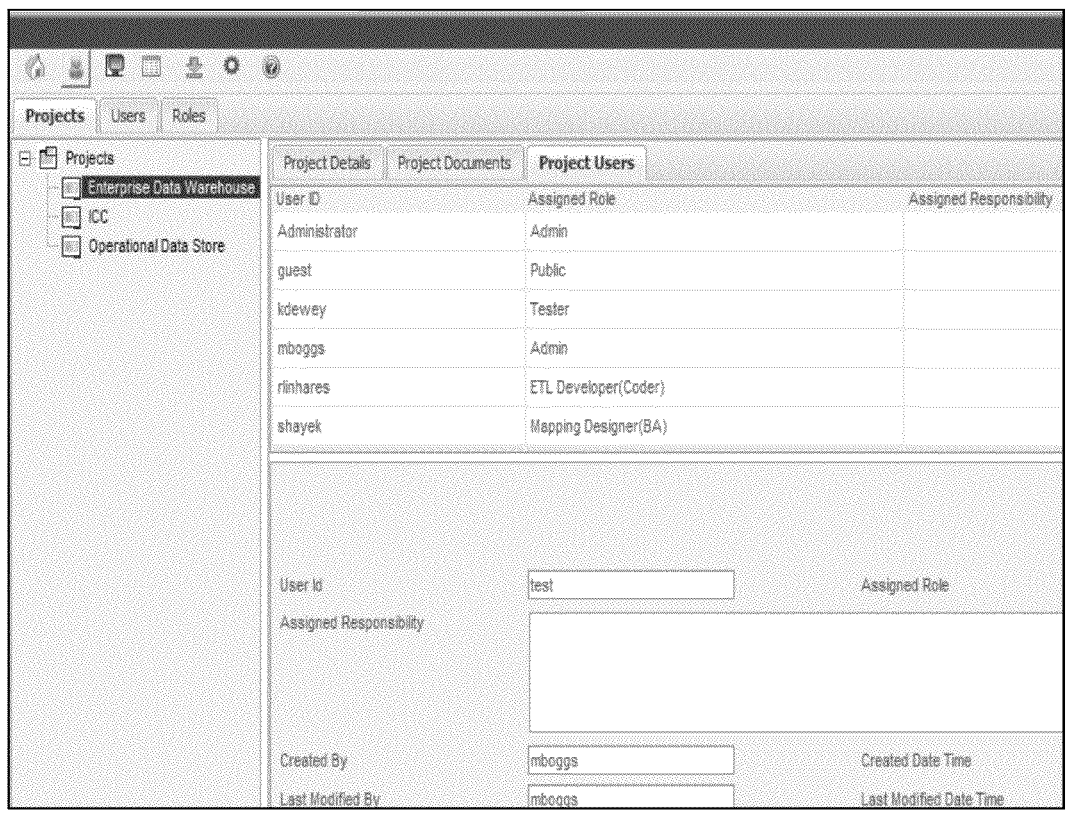
FIG. 6 is a screen shot of a Project manager module, in an embodiment.

FIG. 6 is a screen shot of a Project manager module, in an embodiment. Projects are selected from the left navigation window, which can be toggled between displaying projects and displaying users and roles, and project information is displayed in the main window. Navigating between tabs allows a user to view project details, project documents, and project users.

Figure 7:
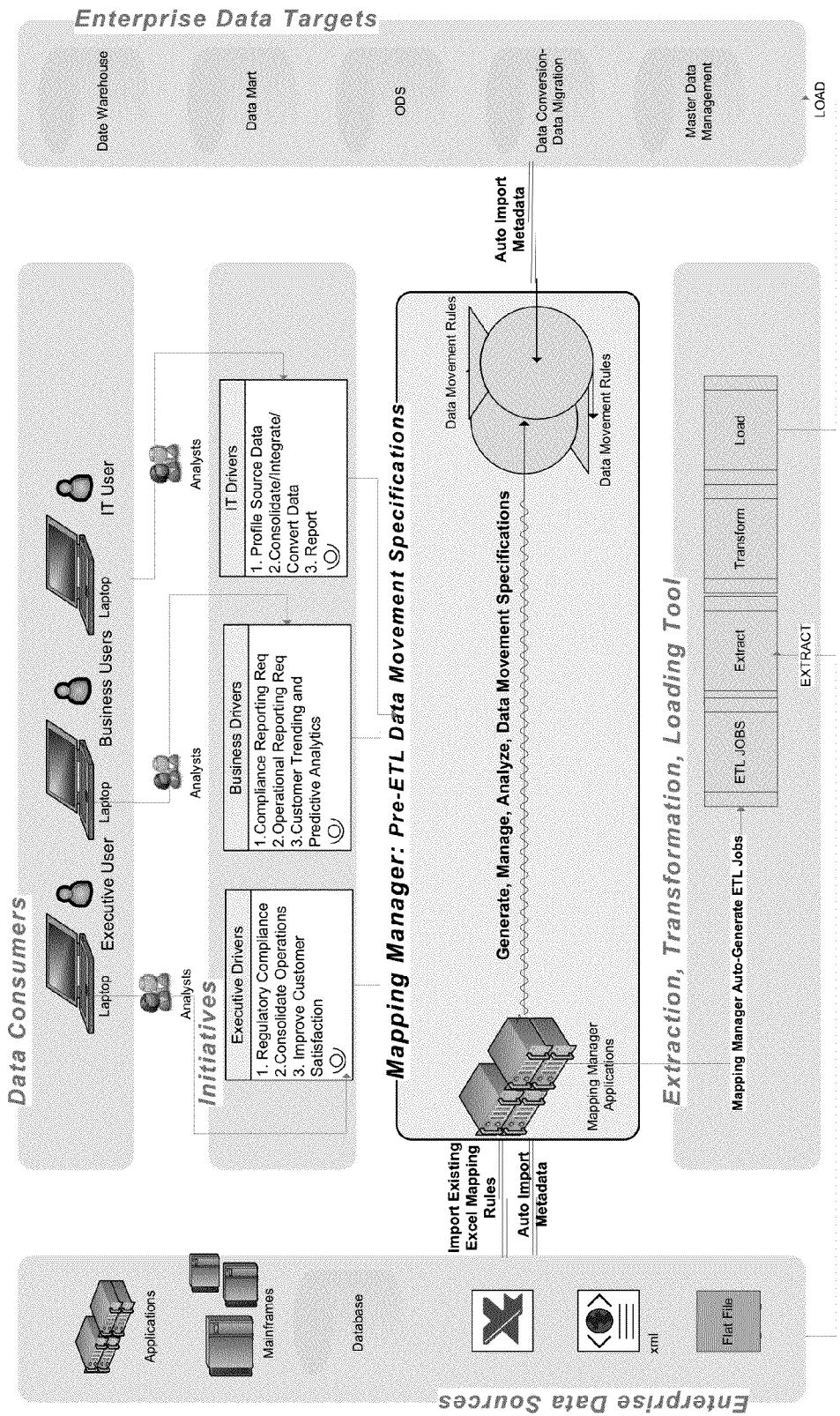
FIG. 7 is a diagram of a Mapping Manager application system, in an embodiment.

FIG. 7 is a diagram of a Mapping Manager application system, in an embodiment. Data from enterprise data sources such as applications, mainframes, databases, excel spreadsheets, xml files, and flat files is extracted and transformed using the ETL tool and loaded onto enterprise data targets such as data warehouses, data marts, operational data stores ("ODS"), data conversion-data migration, and master data management. Mapping manager applications import existing Excel mapping rules and auto-import metadata and automatically generate ETL jobs that govern the extraction and loading performed by the ETL tool. The mapping manager generates, manages, and analyzes data movement specifications and automatically imports metadata from enterprise data targets to generate data movement rules.

Users include executive users, business users, and IT users. Drivers for IT users include profiling source data, consolidating/integrating/converting data, and reporting. Drivers for business users include compliance reporting requirements, operational reporting requirements, and customer trending and predictive analysis. Drivers for executive users include regulatory compliance, consolidation of operations, and improvement of customer satisfaction.

Figure 8:
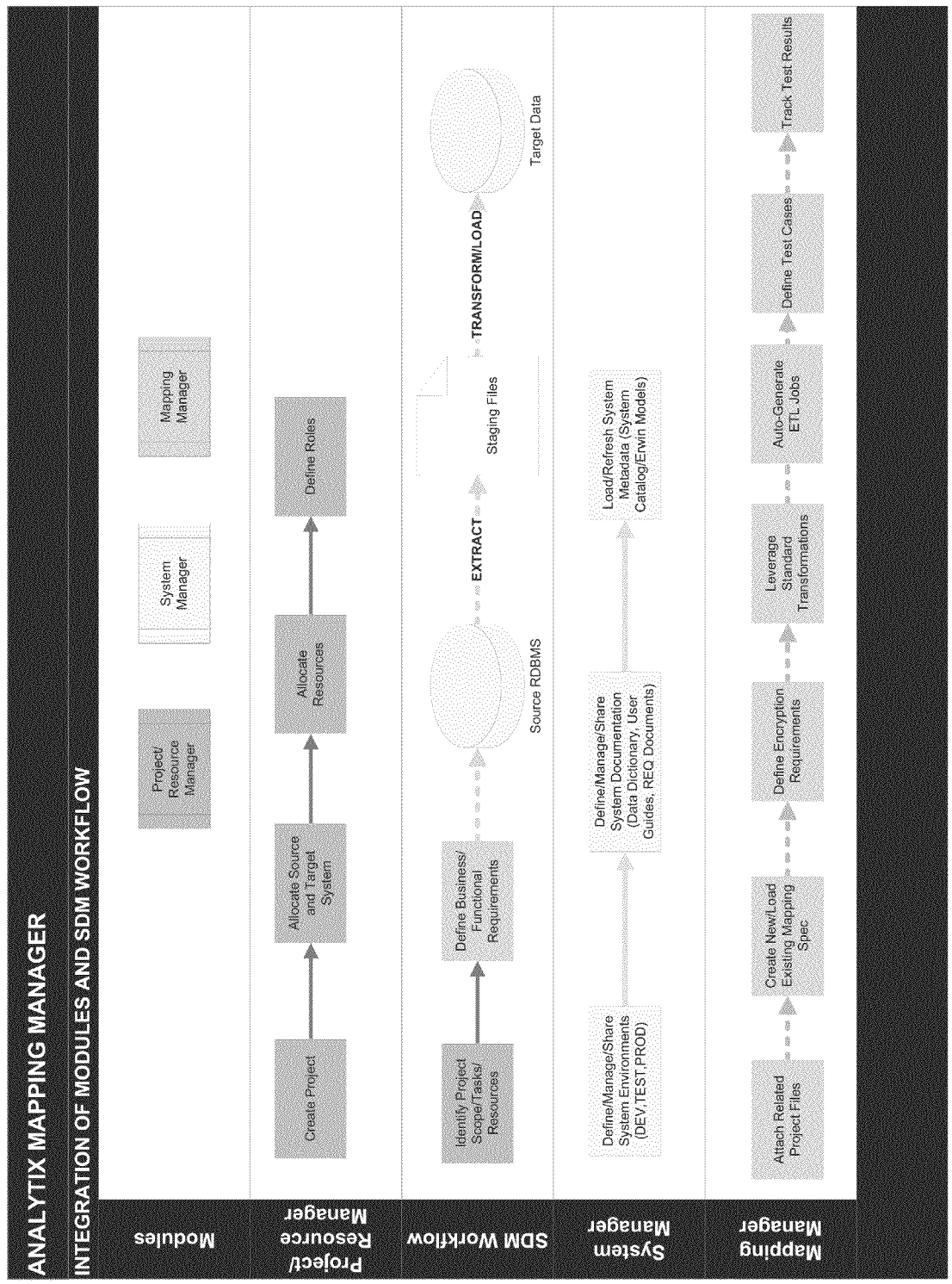
FIG. 8 is a flowchart showing the operation of a Mapping Manager application, in an embodiment.

FIG. 8 is a flowchart showing the operation of a Mapping Manager application, in an embodiment, including integration of the modules and sequence data management ("SDM") workflow. The Project management manager module creates a project, allocates source and target systems for the project, allocates resources, and defines roles. The system manager module defines, manages, and shares system environments (Development, Test, Production), defines, manages and shares system documentation (data dictionary, user guides, requirements documents), and loads/refreshes system metadata (system catalog/erwin models). The mapping manager module attaches related project files, creates new or loads existing mapping specifications, defines encryption requirements, leverages standard transformations, auto-generates ETL jobs, defines test cases and tracks test results.

In an SDM workflow, project scope/tasks/resources are identified using the Project manager module, business/functional requirements are defined using the mapping manager module, staging files are extracted from a source relational database management system (RDBMS) by the system manager module and transformed and loaded into target data.

FIG. 9 is a flowchart showing the operation of a Mapping Manager application, in an embodiment. Metadata is scanned and stored in a built-in meta data repository, data mappings are stored in a built-in data mapping repository, metadata is dragged and dropped to build and version data mappings, users collaborate and view data lineages, mapping assignment and status are tracked, enterprise data dictionaries are managed, and ETL/ELT data movement jobs are automatically generated. Built-in mapping intelligence and metadata reports allow for mining the repositories for custom reports or the generation of canned reports of system analysis, mapping specification, mapping validation, data dictionary, impact analysis, etc. Data mappings are exported to formatted data mapping specifications or an integration library.

Figure 10:
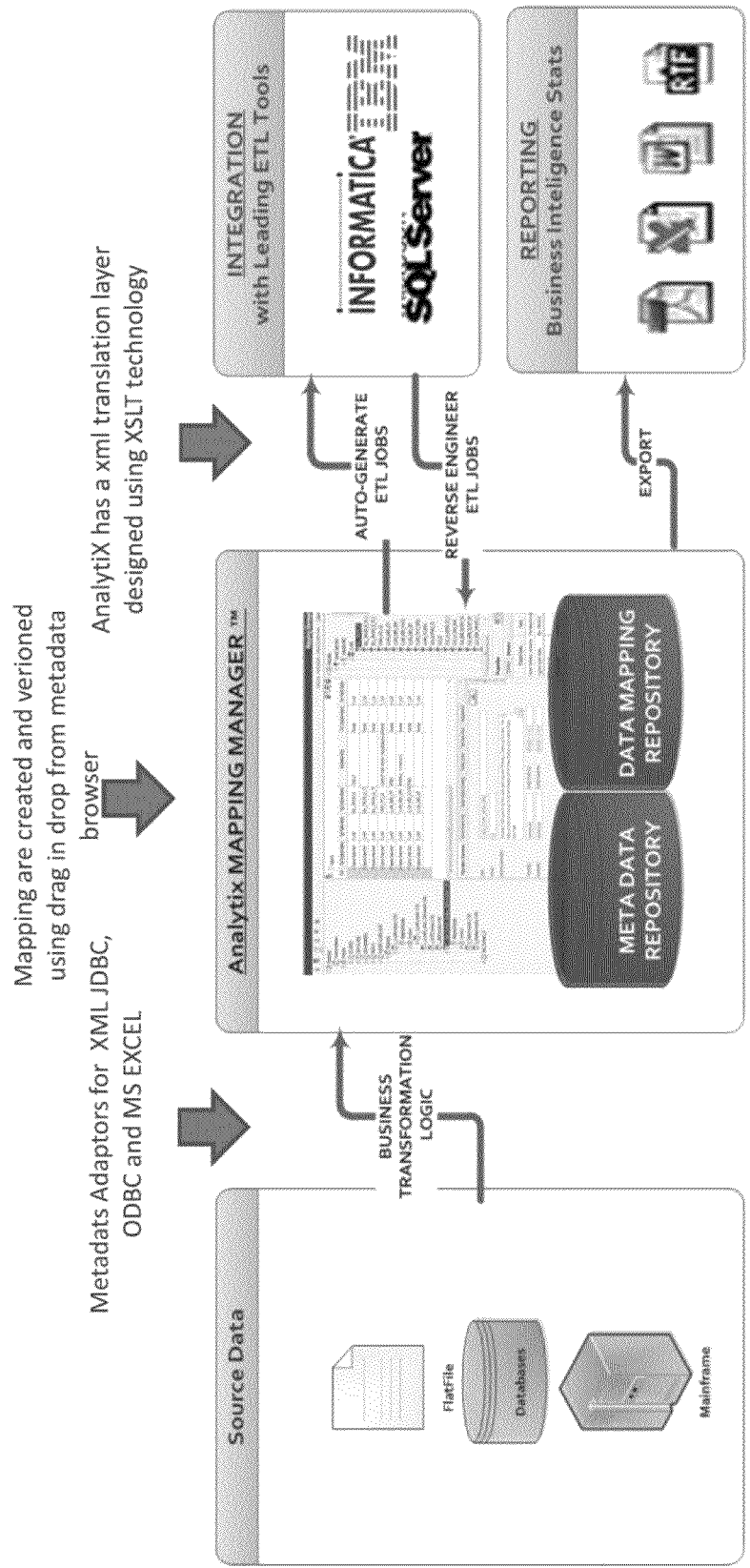
FIG. 10 is a diagram illustrating ETL auto-generation and reverse engineering process flow, in an embodiment.

FIG. 10 is a diagram illustrating ETL auto-generation and reverse engineering process flow. Source date is transformed using business transformation logic and metadata adapters for e.g., XML, JDBC, ODBC and MS Excel, mappings are created and versioned using drag 'n drop from a metadata browser, and mappings are used to auto-generate ETL jobs with an xml translation layer designed using XSLT technology and exported for reporting business intelligence stats in various formats. ETL jobs can also be reverse engineered into data mappings within the mapping manager.

Figure 11:
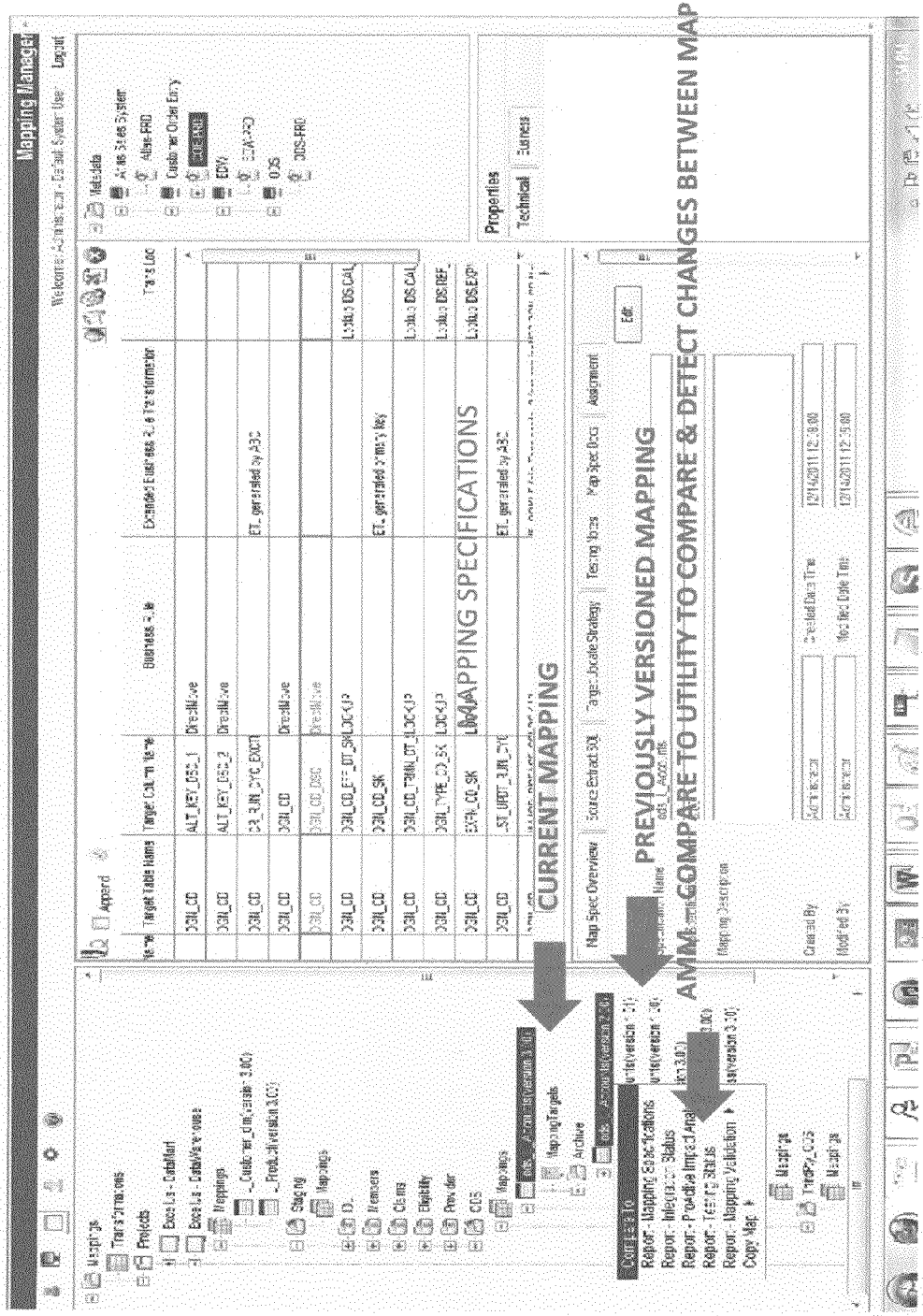
FIG. 11 is a mapping and version control management screen, in an embodiment.

FIG. 11 is a mapping and version control management screen, from which a user can view mapping specifications, current mapping, previously versioned mapping, and a "compare to" utility to compare and detect changes between mappings.

FIG. 12 is a mapping "compare to" utility-detect changes screen, which shows the current mapping and previous mapping, which changes highlighted in red.

Figure 13:
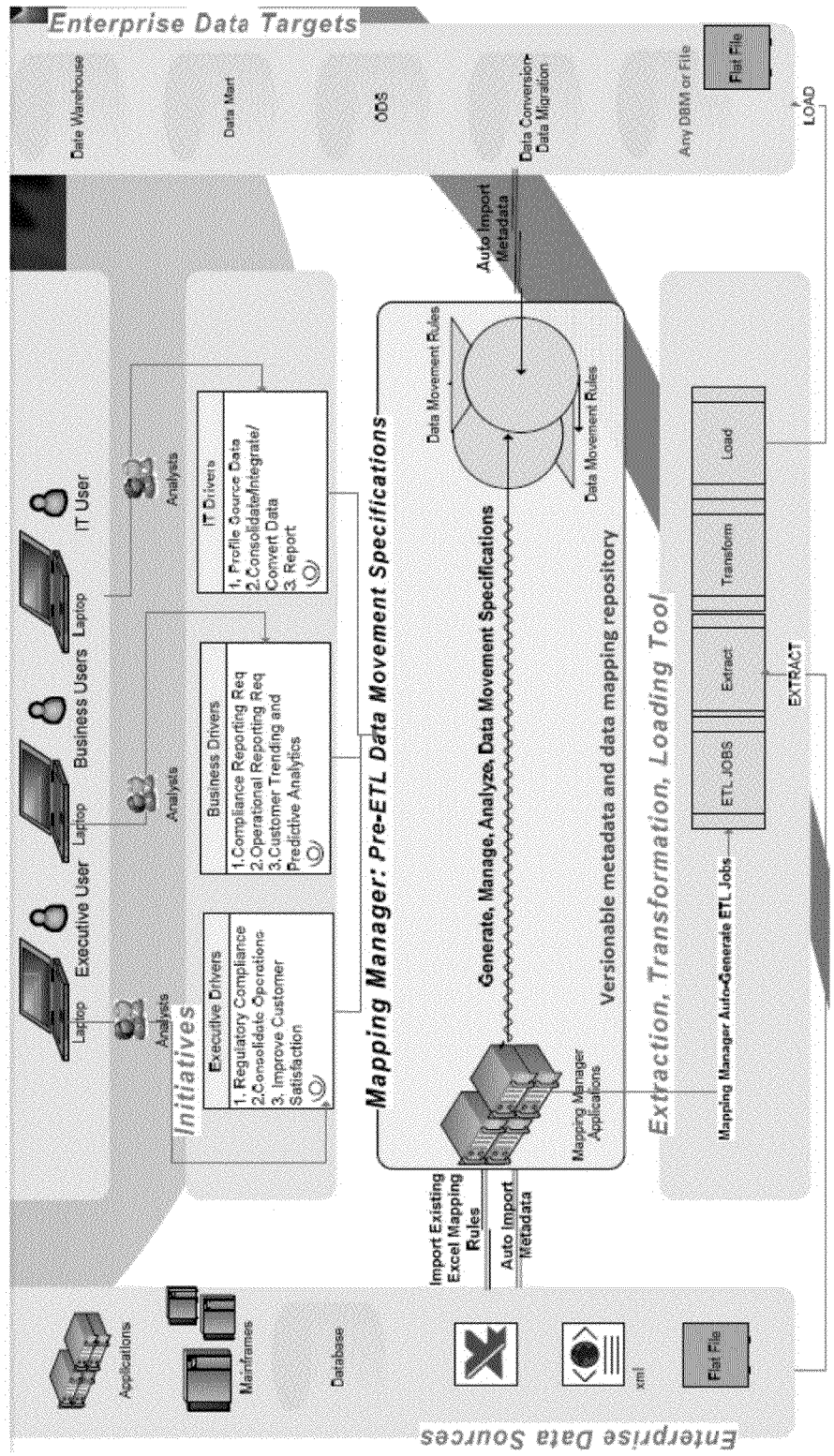
FIG. 13 is a diagram of the technical mechanics of a Mapping Manager application system, in an embodiment.

FIG. 13 is a diagram of the technical mechanics of a Mapping Manager application system, in an embodiment.

Figure 14:
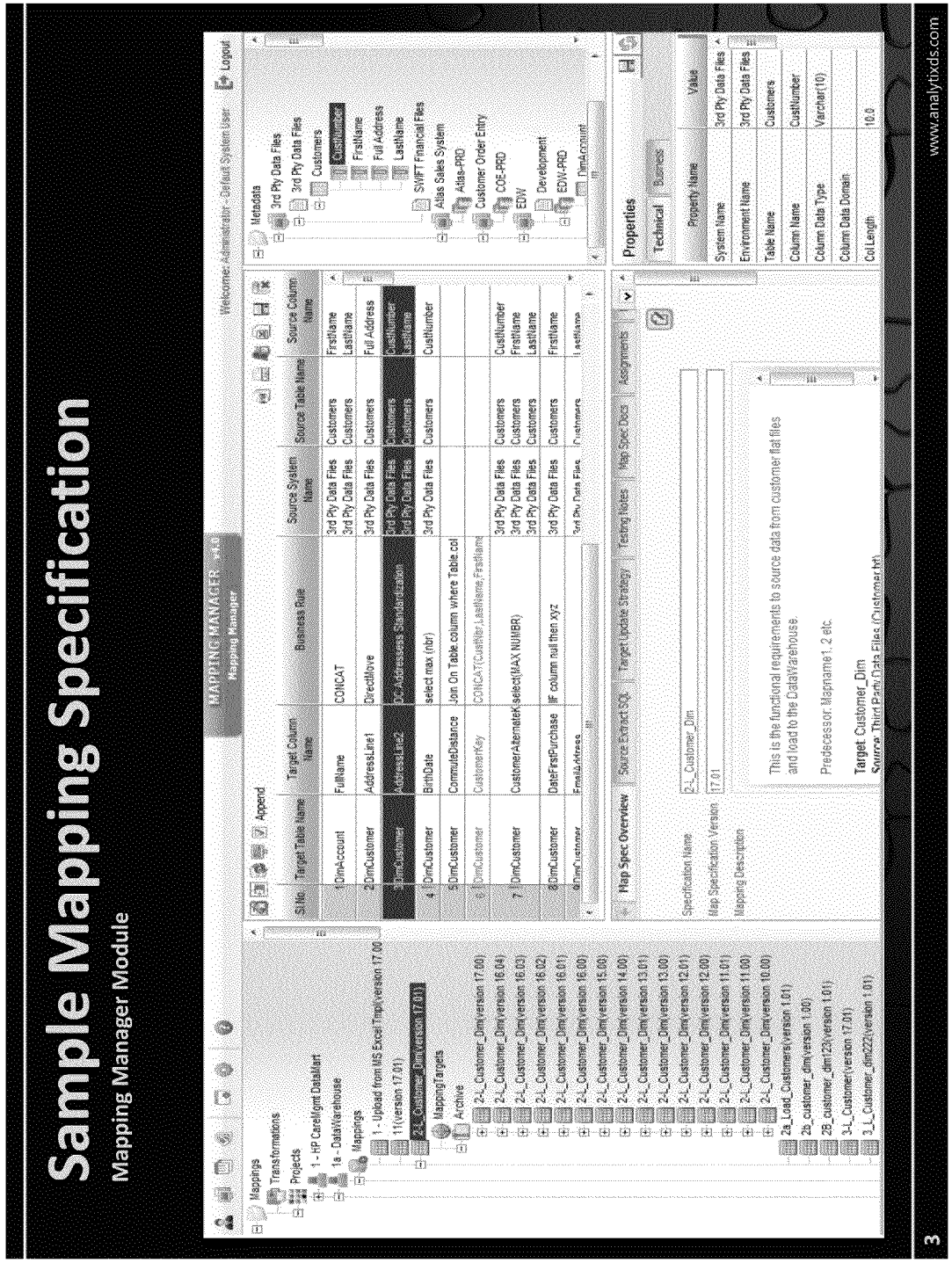
FIG. 14 is a screen shot of a sample mapping specification, in an embodiment.

FIG. 14 is a screen shot of a sample mapping specification.

Figure 15:
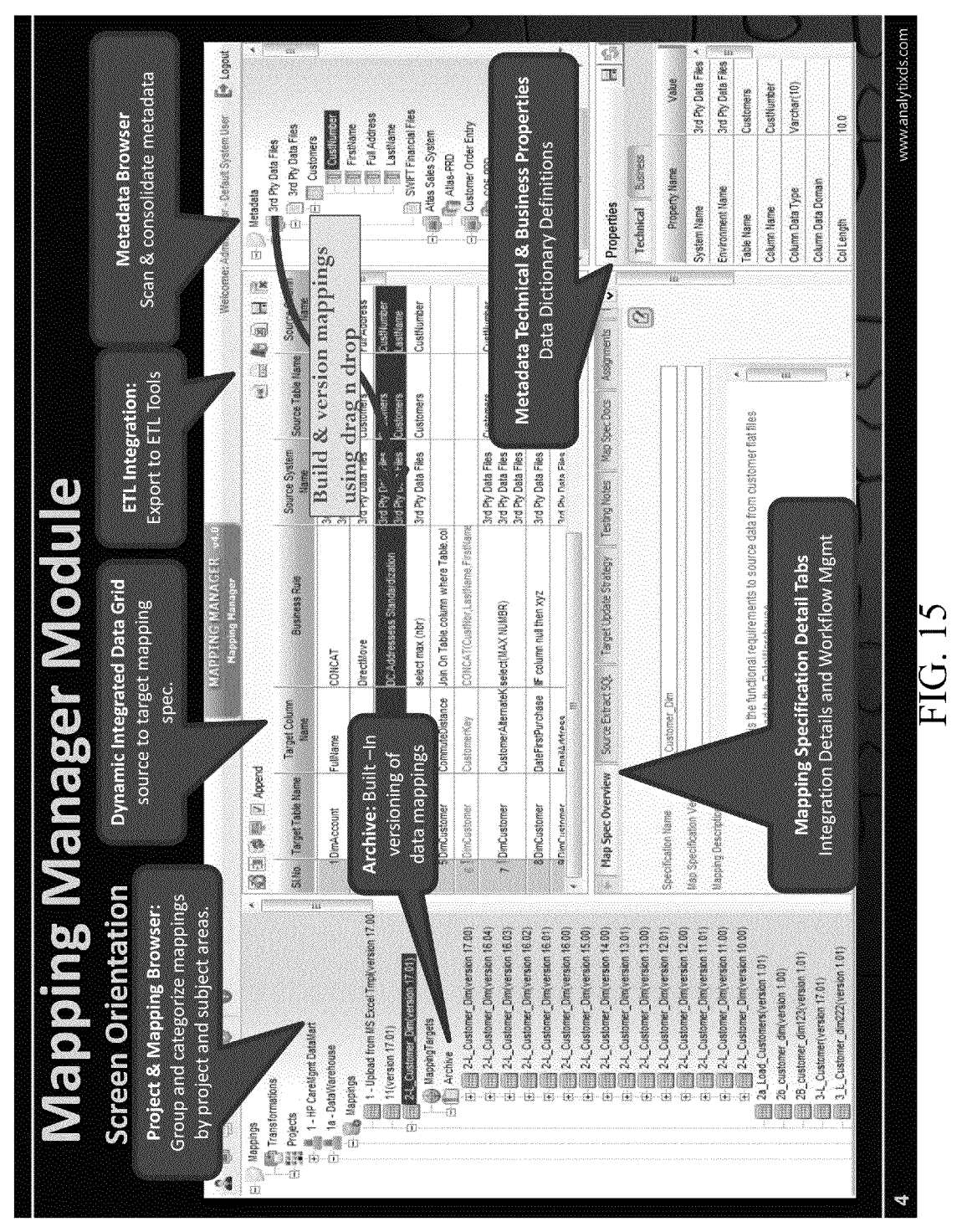

FIG. 15 is a screen orientation for a mapping manager module. This screen shot shows source-to-target mappings for a set of data, here customer address information. Other available mappings can be viewed by selecting them from the left navigation window. The screen shows various areas of the module display, including the project and mapping browser, with built-in versioning for iterative mappings, dynamic integrated mapping data grid, export and ETL integration capabilities, metadata browser (system catalog) enabling drag and drop mapping capability, technical and business properties pane, and mapping spec detail tabs for source extract rules, update rules, testing dispositions, file documents, workflow and resource status assignments.

Figure 16:
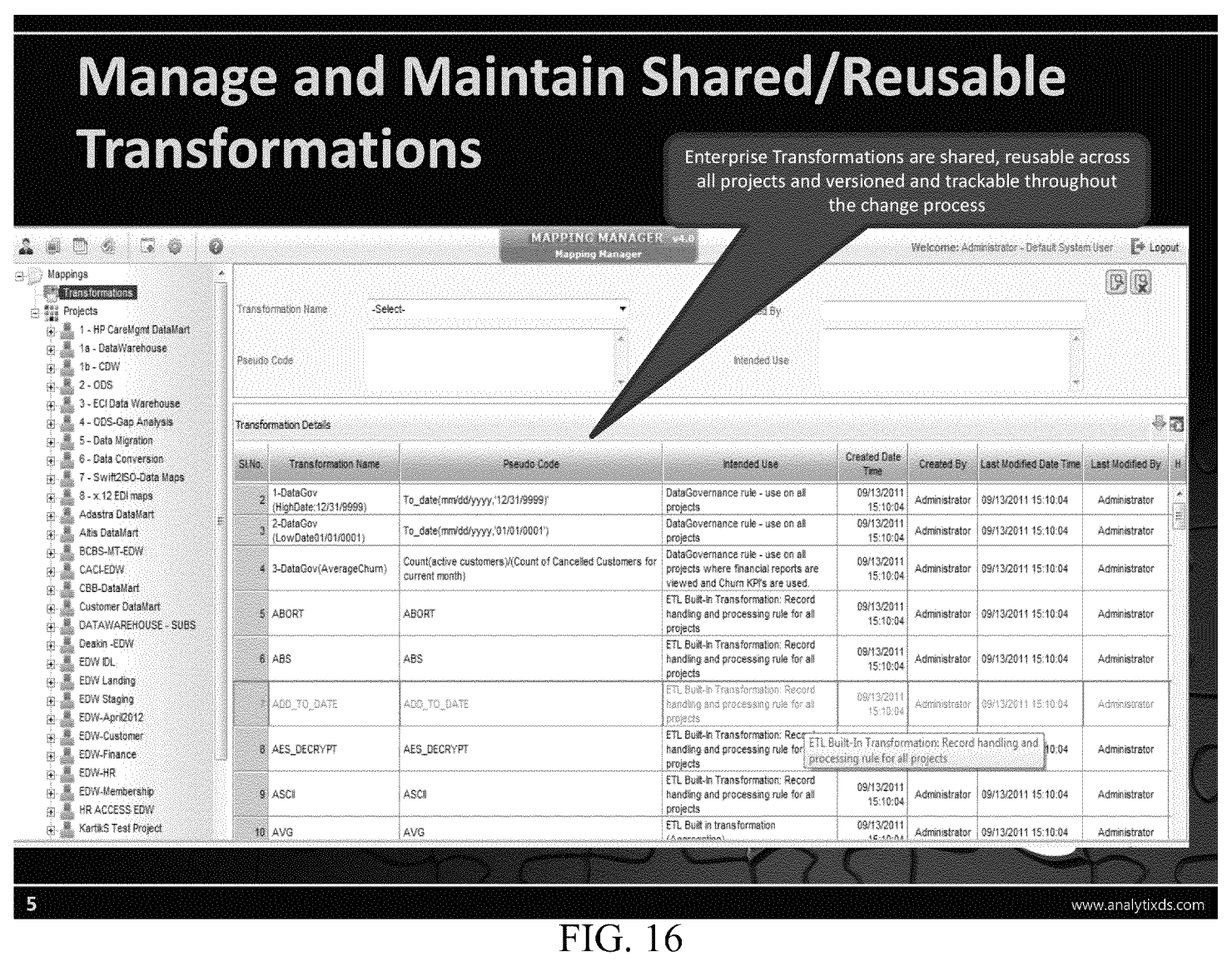

FIG. 16 is a screen shot illustrating the management and maintenance of shared/reusable transformations. Enterprise transformations are shared, reusable across all projects and versioned and trackable throughout the change process.

Figure 17:
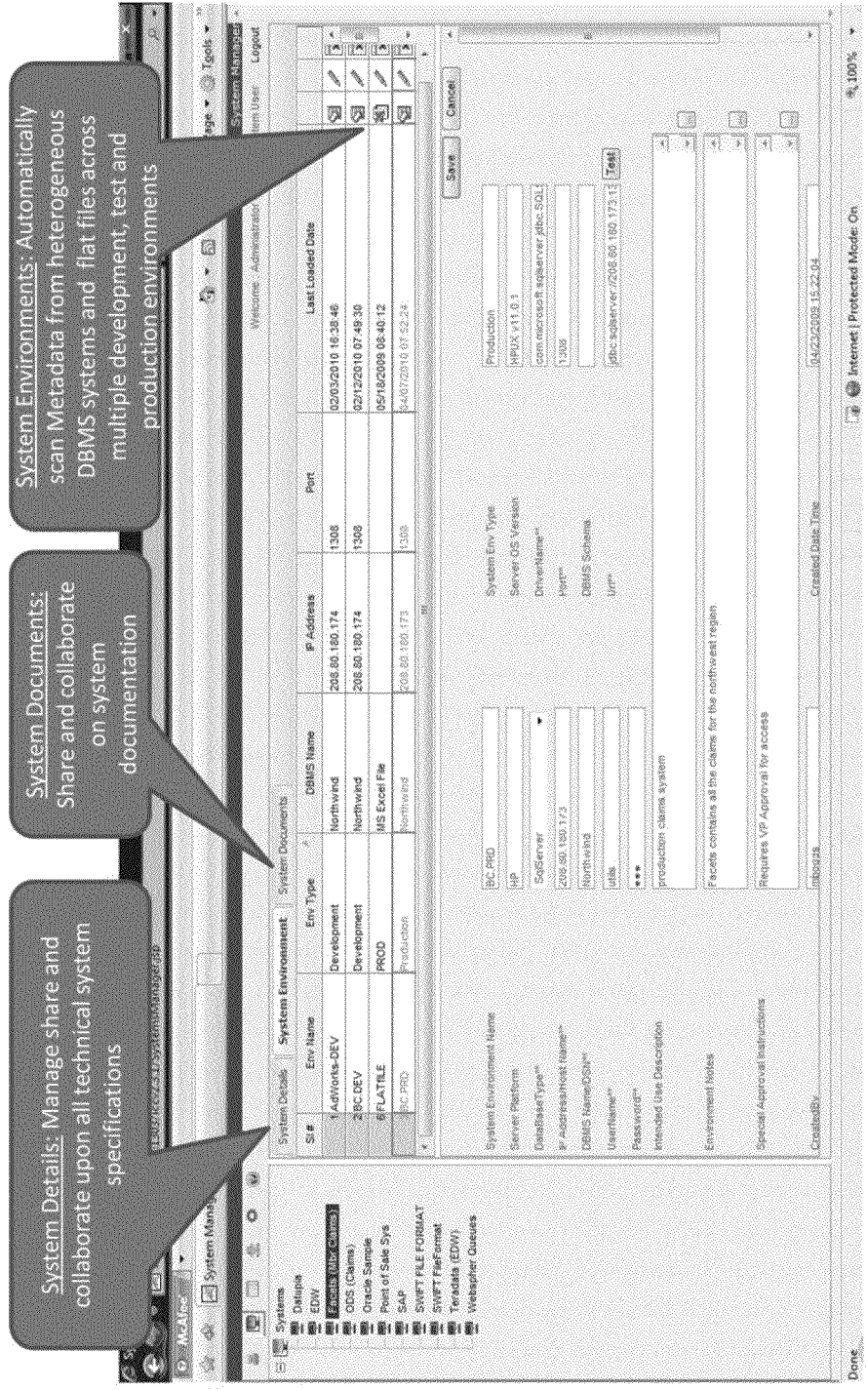
FIG. 17 is a screen shot showing the scanning and management of system metadata, in an embodiment.

FIG. 17 is a screen shot showing the scanning and management of system metadata. There are tabs for system details, allowing the user to manage, share, and collaborate on all technical system specifications, system documents, allowing a user to share and collaborate on system documentation, and system environments, automatically scanning metadata from heterogeneous DBMS systems and flat files across multiple development, test, and production environments.

Figure 18:
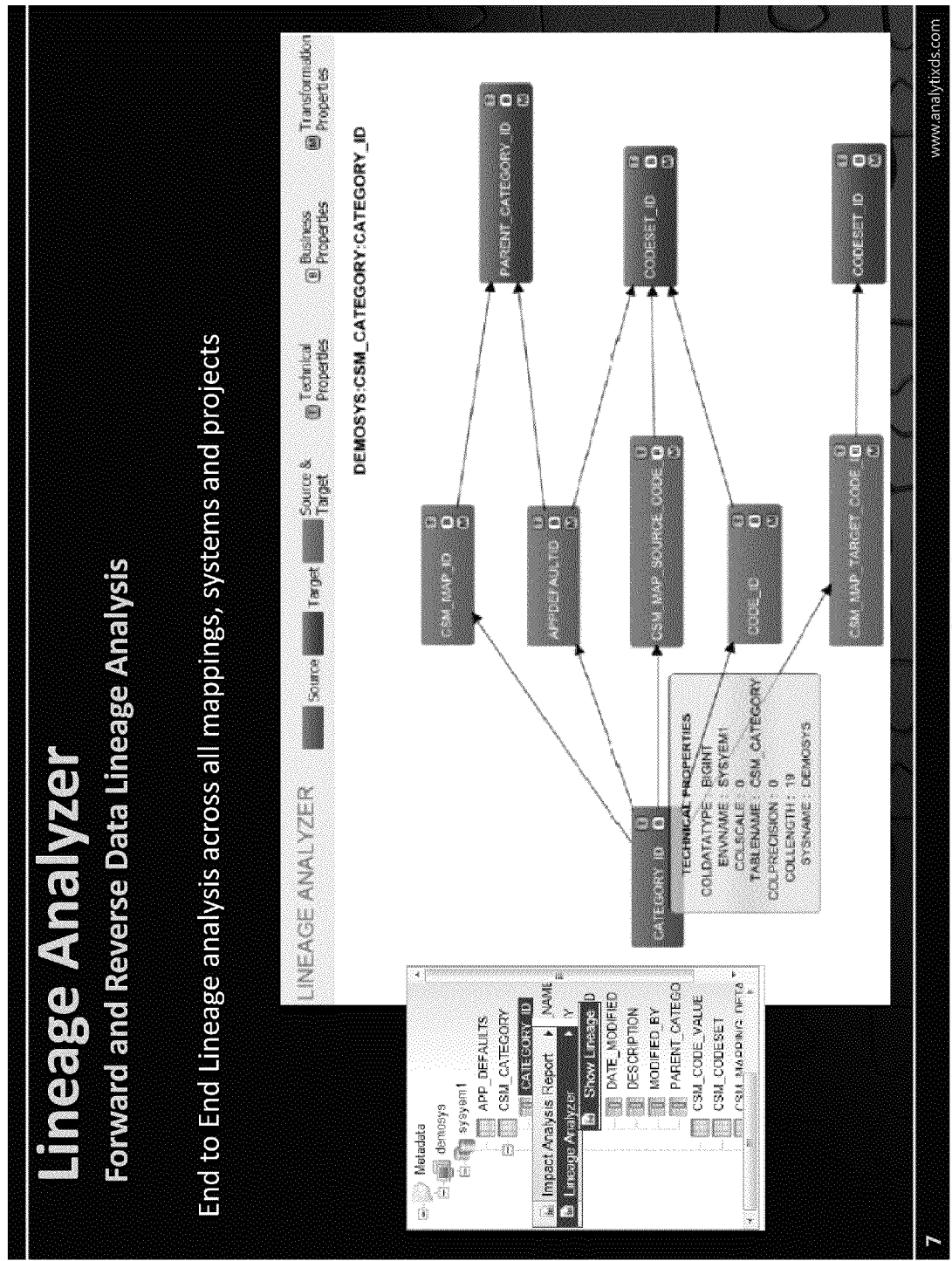
FIG. 18 is a screen shot showing forward and reverse data lineage analysis, in an embodiment.

FIG. 18 is a screen shot showing forward and reverse data lineage analysis, in an embodiment. The mappings are stored in a DBMS (database management system) repository, which is queried using SQL to generate graphical displays of the data stored in the repository. Source system table and column metadata (business & technical properties), target table and column metadata (business & technical properties) and all business transformation rules are shown as data get sourced, transformed and moved. The linkages illustrate how data is moved and transformed so if a column: category_id gets mapped to and is renamed to another column such as: appdefault_id, code_id, and later gets mapped further to parent_category_id and codeset_id, all the "hops" and transformations along the way are shown.

Source and target tablenames and column names (all business technical properties of both) are shown along with the transformation rules, as the data gets transformed as it is federated/moved inside and outside of the organization. By hovering a mouse icon over the small T, B, and M icons, underlying metadata properties and transformation rules are displayed and organized on the screen.

The Lineage Analyzer goes across all mappings organized in a mapping manager system and the Source & Target elements illustrate where a table.column (data element) is used in some mappings as a source and as a target in other data mappings and how that element is moved and transformed to other target systems to the right, highlighted in brown. Typically the migration process follows SOURCE TABLE.COLUMNNAME-TRANSFORMATION RULE-TARGET TABLE.COLUMNNAME. The source is what the columns are is in the source system (e.g. customer system), the transformation rules are the transformation rules which apply to the column as the column is "being moved" (e.g. append "001" to customer id) and target column is the target column in another system or file the elements are being moved to (e.g. customer id is renamed to CUST_ID).

Figure 19:
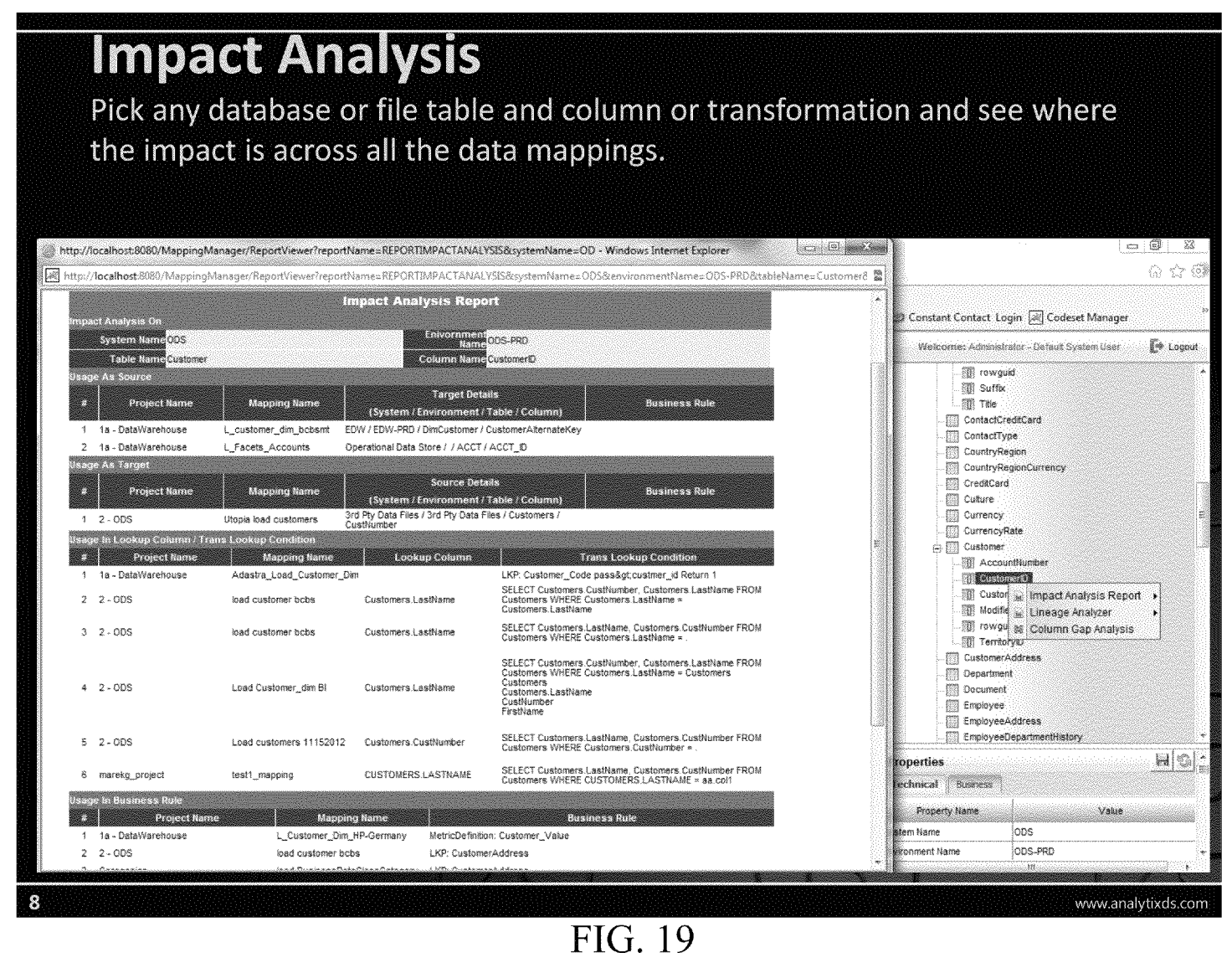

FIG. 19 is a screen shot showing an impact analysis of a database or file table and column, in an embodiment. For a given database or file table and column or transformation, this analysis shows its impact across all data mappings, e.g. in which it acts as a source, in which as a target, in which it is used in a business rule, etc.

In the foregoing specification, embodiments have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, Python, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A data mapping manager system, comprising:
a metadata repository configured to store table and column names for use in data integration projects;
a transformation rules store configured to store transformation rules to be applied to source data before loading the source data into target destinations, for use in data integration projects; and
one or more processors configured to execute computer program modules, the computer program modules comprising:
a data integration project information input module configured to receive information relating to a data integration project comprising data source information and data target information;
a scanning and metadata retrieval module configured to scan at least one of a data source and a data target to locate metadata and extract the located metadata to the metadata repository;
a transformation rules generation and assignment module configured to generate transformation rules from user input and add them to the transformation rules store, to modify transformation rules in the transformation rules store based on user input, and to assign transformation rules to the data integration project based on user selections from the transformation rules store;
a data mappings generator module configured to generate data mappings between source data and target data for the data integration project using metadata extracted from the data source and the data target and the transformation rules assigned to the data integration project;
a data mappings organization and display module configured to organize and display data mappings for multiple data integration projects;
an agnostic ETL job generator module configured to auto-generate an ETL job for any of at least two ETL software tools based on the generated data mappings; and
a versioning module configured to save point-in-time snapshots of the generated data mappings and to show element-by-element comparisons between the saved snapshots of the generated data mappings.

2. The system of claim 1, wherein the versioning module is further configured to save point-in-time snapshots of the transformation rules in the transformation rules store and to show element-by-element comparisons between the saved snapshots of the transformation rules.

3. A data mapping manager system, comprising:
a metadata repository configured to store table and column names for use in data integration projects;
a transformation rules store configured to store transformation rules to be applied to source data before loading the source data into target destinations, for use in data integration projects; and
one or more processors configured to execute computer program modules, the computer program modules comprising:
a data integration project information input module configured to receive information relating to a data integration project comprising data source information and data target information;
a scanning and metadata retrieval module configured to scan at least one of a data source and a data target to locate metadata and extract the located metadata to the metadata repository;
a transformation rules generation and assignment module configured to generate transformation rules from user input and add them to the transformation rules store, to modify transformation rules in the transformation rules store based on user input, and to assign transformation rules to the data integration project based on user selections from the transformation rules store;
a data mappings generator module configured to generate data mappings between source data and target data for the data integration project using metadata extracted from the data source and the data target and the transformation rules assigned to the data integration project;
a data mappings organization and display module configured to organize and display data mappings for multiple data integration projects;
an agnostic ETL job generator module configured to auto-generate an ETL job for any of at least two ETL software tools based on the generated data mappings; and
a versioning module configured to save point-in-time snapshots of the generated data mappings and to show element-by-element comparisons between the saved snapshots of the generated data mappings, wherein the computer program modules further comprise a lineage analyzer module, wherein the lineage analyzer module is configured to generate graphical displays for selected column names stored in the metadata repository, showing a progression of column names for data associated with the selected column names due to associated data integration projects and transformation rules applied in each associated data integration project.

4. The system of claim 3, wherein the graphical displays further show underlying metadata properties for each column name in the progression.

5. The system of claim 1, wherein the computer program modules further comprise an ETL job reverse engineering module configured to import an ETL job from an ETL software tool and extract associated data mappings.

6. The system of claim 1, wherein the computer program modules further comprise an audit trail module, wherein the audit trail module is configured to track and audit every action performed by a user on the system surrounding metadata and data mapping changes.

7. The system of claim 1, wherein the data mappings organization and display module is further configured to organize and display data mappings by data integration project and subject area in a project and mapping browser.

8. The system of claim 1, wherein the data mappings generator module is further configured to automatically update the data mappings for the data integration project in accordance with changes made to at least one of the data source, data target, and assigned transformation rules, and wherein the versioning module is further configured to save a point-in-time snapshot of the generated data mappings when the data mappings are automatically updated by the data mappings generator module.

9. The system of claim 1, wherein the computer program modules further comprise a reporting module configured to mine the metadata repository and transformation rules store to generate mapping intelligence and metadata reports, including at least one of system analysis reports, mapping specification reports, mapping validation reports, data dictionary reports, and impact analysis reports.

10. The system of claim 1, wherein the data mappings generator module is further configured to generate data mappings between source data and multiple target locations for the data integration project.

11. A computer-implemented data mapping management method, the method being implemented in a computer system that includes one or more processors executing computer program modules, the method comprising:
receiving information relating to a data integration project comprising data source information and data target information;
scanning at least one of a data source and a data target, locating metadata and extracting the located metadata to a metadata repository;
generating transformation rules from user input and adding them to a transformation rules store, modifying transformation rules in the transformation rules store based on user input, and assigning transformation rules to the data integration project based on user selections from the transformation rules store;
generating data mappings between source data and target data for the data integration project using metadata extracted from the data source and the data target and the transformation rules assigned to the data integration project;
organizing and displaying data mappings for multiple data integration projects;
generating an ETL job for any of at least two ETL software tools based on the generated data mappings; and
saving point-in-time snapshots of the generated data mappings and showing element-by-element comparisons between the saved snapshots of the generated data mappings.

12. The method of claim 11, further comprising saving point-in-time snapshots of the transformation rules in the transformation rules store and showing element-by-element comparisons between the saved snapshots of the transformation rules.

13. A computer-implemented data mapping management method, the method being implemented in a computer system that includes one or more processors executing computer program modules, the method comprising:
receiving information relating to a data integration project comprising data source information and data target information;
scanning at least one of a data source and a data target, locating metadata and extracting the located metadata to a metadata repository;
generating transformation rules from user input and adding them to a transformation rules store, modifying transformation rules in the transformation rules store based on user input, and assigning transformation rules to the data integration project based on user selections from the transformation rules store;
generating data mappings between source data and target data for the data integration project using metadata extracted from the data source and the data target and the transformation rules assigned to the data integration project;
organizing and displaying data mappings for multiple data integration projects;
generating an ETL job for any of at least two ETL software tools based on the generated data mappings; and
saving point-in-time snapshots of the generated data mappings and showing element-by-element comparisons between the saved snapshots of the generated data mappings, further comprising generating graphical displays for selected column names stored in the metadata repository showing a progression of column names for data associated with the selected column names due to associated data integration projects and transformation rules applied in each associated data integration project.

14. The method of claim 13, wherein the graphical displays further show underlying metadata properties for each column name in the progression.

15. The method of claim 11, further comprising importing an ETL job from an ETL software tool and extracting associated data mappings.

16. The method of claim 11, further comprising tracking and auditing every action performed by a user on the system.

17. The method of claim 11, wherein organizing and displaying data mappings for multiple data integration projects further comprises organizing and displaying data mappings by data integration project and subject area in a project and mapping browser.

18. The method of claim 11, further comprising updating the data mappings for the data integration project in accordance with changes made to at least one of the data source, data target, and assigned transformation rules, and saving a point-in-time snapshot of the generated data mappings after updating the data mappings.

19. The method of claim 11, further comprising mining the metadata repository and transformation rules store to generate mapping intelligence and metadata reports, including at least one of system analysis reports, mapping specification reports, mapping validation reports, data dictionary reports, and impact analysis reports.

20. The method of claim 11, further comprising generating data mappings between source data and multiple target locations for the data integration project.

* * * * *